May 5, 1964 J. M. WEST ETAL 3,132,076
NUCLEAR REACTOR
Filed March 14, 1960 5 Sheets-Sheet 1

INVENTORS
John M. West
Robert W. Deutsch
BY Eldon H. Luther
ATTORNEY

May 5, 1964   J. M. WEST ETAL   3,132,076
NUCLEAR REACTOR

Filed March 14, 1960   5 Sheets-Sheet 3

INVENTORS
John M. West
Robert W. Deutsch
BY Eldon H. Luther
ATTORNEY

May 5, 1964 J. M. WEST ETAL 3,132,076
NUCLEAR REACTOR
Filed March 14, 1960 5 Sheets-Sheet 4

INVENTORS
John M. West
Robert W. Deutsch
BY Eldon H. Luther
ATTORNEY

United States Patent Office 3,132,076
Patented May 5, 1964

3,132,076
NUCLEAR REACTOR
John M. West, Dunedin, and Robert W. Deutsch, Clearwater, Fla., assignors, by mesne assignments, to the United States of America as represented by the United States Atomic Energy Commission
Filed Mar. 14, 1960, Ser. No. 14,723
3 Claims. (Cl. 176—44)

This invention relates to nuclear reactors and particularly to reactors moderated and/or cooled with hydrogenous material with the reactor being controlled by control rods that are movable into and out of the core.

In reactors of this type one of the prevailing problems is that the fuel located near the moderator filled control rod channels operates at a higher specific power than other fuel in the core. This results from extra thermalization of neutrons in the rather large amount of moderator in the control rod channel, a characteristic which is commonly called the "water hole effect." In a thermal reactor, neutrons are slowed down in the moderator and are captured in the fuel at thermal neutron energies. The presence of nonuniform moderator distribution throughout a fuel assembly consisting of several fuel elements, such as rods or plates, provides a nonuniform source of thermal neutrons so that those fuel elements adjacent to large moderator regions will be capturing more neutrons than those adjacent small moderator regions; the net result being that the individual elements are operating at different power levels. Since the heat output of the assembly is limited by the ability of the hottest element to transfer its heat to the coolant, the uneven distribution of power in the fuel elements results in a lower thermal output from the assembly as a whole with these hot spots in the reactor core lowering the total power level of the reactor. This reduction amounts to as much as 30% in some cases.

While in principle, the simplest way to overcome this difficulty would be to space the fuel elements so that the moderator is uniform everywhere with relation to the elements, this is impracticable since it is necessary, for mechanical reasons, to group the fuel elements in assemblies or boxes and since these fuel boxes are finite, nonuniform moderator distributions occur. Furthermore, control elements such as cruciforms are usually positioned between fuel boxes and since these control elements require substantial mechanical clearance it is not possible to adjust these spaces to make the moderator more uniform, in fact, control rod channels will usually increase the amount of moderator as seen by the fuel elements adjacent to the channels compared with the internal fuel elements of an assembly.

The present invention alleviates the problem of hot spots in the reactor core by arranging the fuel assemblies which are generally uniformly distributed throughout the transverse section of the core in such a way that all the fuel rods are adjacent to moderator filled channels wherefor the moderator effect with relation to each fuel rod in the assembly is generally the same with the fuel elements or rods in a particular assembly operating in a generally uniform neutron flux.

It is an object of this invention to provide an improved nuclear reactor having a core controlled by adjustable control rods.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawings wherein.

Figure 1:
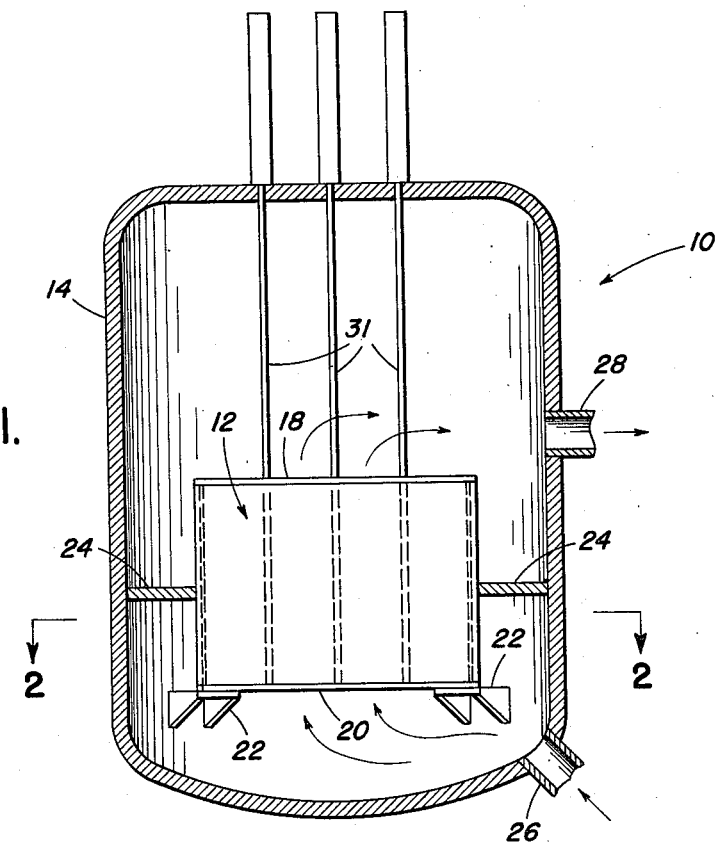
FIG. 1 is a diagrammatic representation in the nature of a vertical sectional view through a nuclear reactor embodying the present invention.
Figure 2:
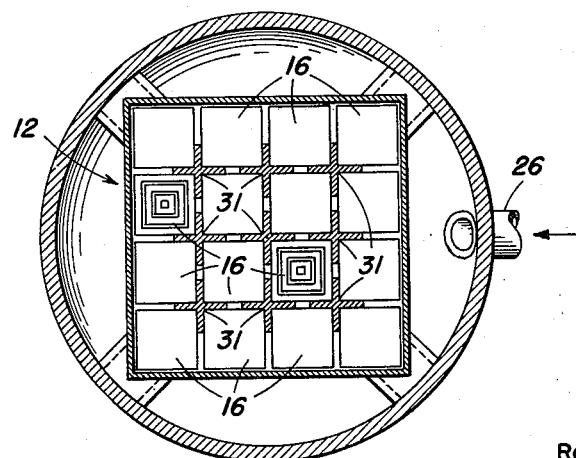
FIG. 2 is a transverse sectional view taken along line 2—2 of FIG. 1.

Referring now to the drawings, wherein like reference characters are used throughout to designate like elements, the illustrative and preferred embodiment of the invention depicted therein includes a nuclear reactor designated generally 10 and which includes reactor core 12 disposed and retained within vessel 14. This core is made up of a number of separate fuel assemblies 16 which are vertically elongated with their axes being parallel with the axis of the vessel and with these assemblies being retained in spaced relation in the array disclosed in FIG. 2 wherein the assemblies are generally uniformly distributed throughout the transverse section of the core and with the core 12 having upper and lower end plates or grids 18 and 20, respectively, which are effective to support and retain the fuel assemblies in their operative relation. As mentioned each of the assemblies is separate with each being independent of its adjacent assemblies and independently removable from the core.

The reactor core is supported on support members 22 extending inwardly from the wall of vessel 14 and, as illustratively shown, the core is square in transverse section with the space between the core and the side wall of the vessel being closed or restricted by baffle member 24 so that the coolant for the reactor, which may be water or other known coolants that also act as moderators, will pass up through the core from inlet 26 and exit from the vessel through outlet 28.

Figure 3:
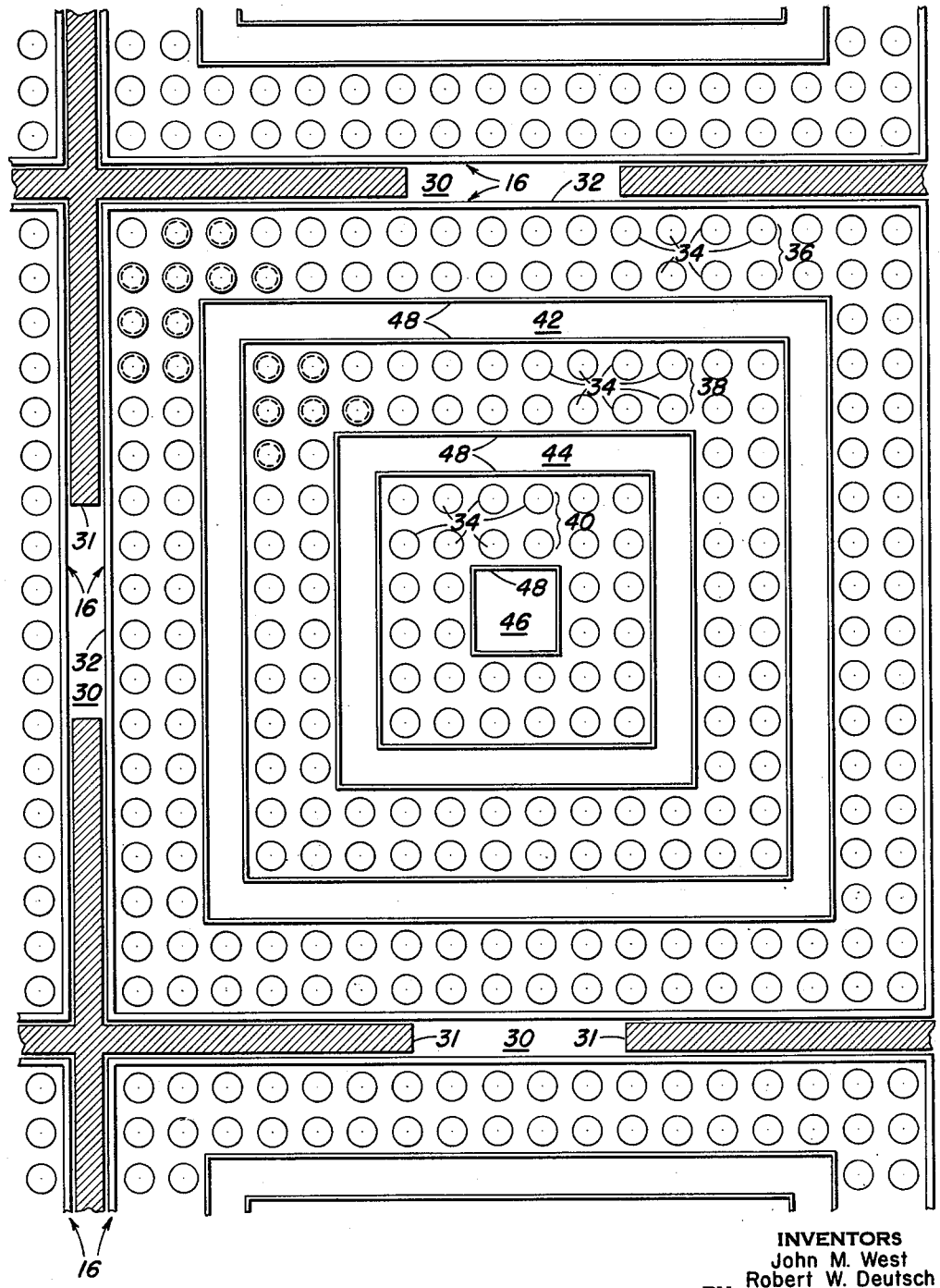
FIG. 3 is an enlarged fragmentary transverse sectional view through a portion of the reactor core showing details with regard to the construction and design of one of the fuel assemblies and its relation with the adjacent fuel assemblies.
Figure 4:
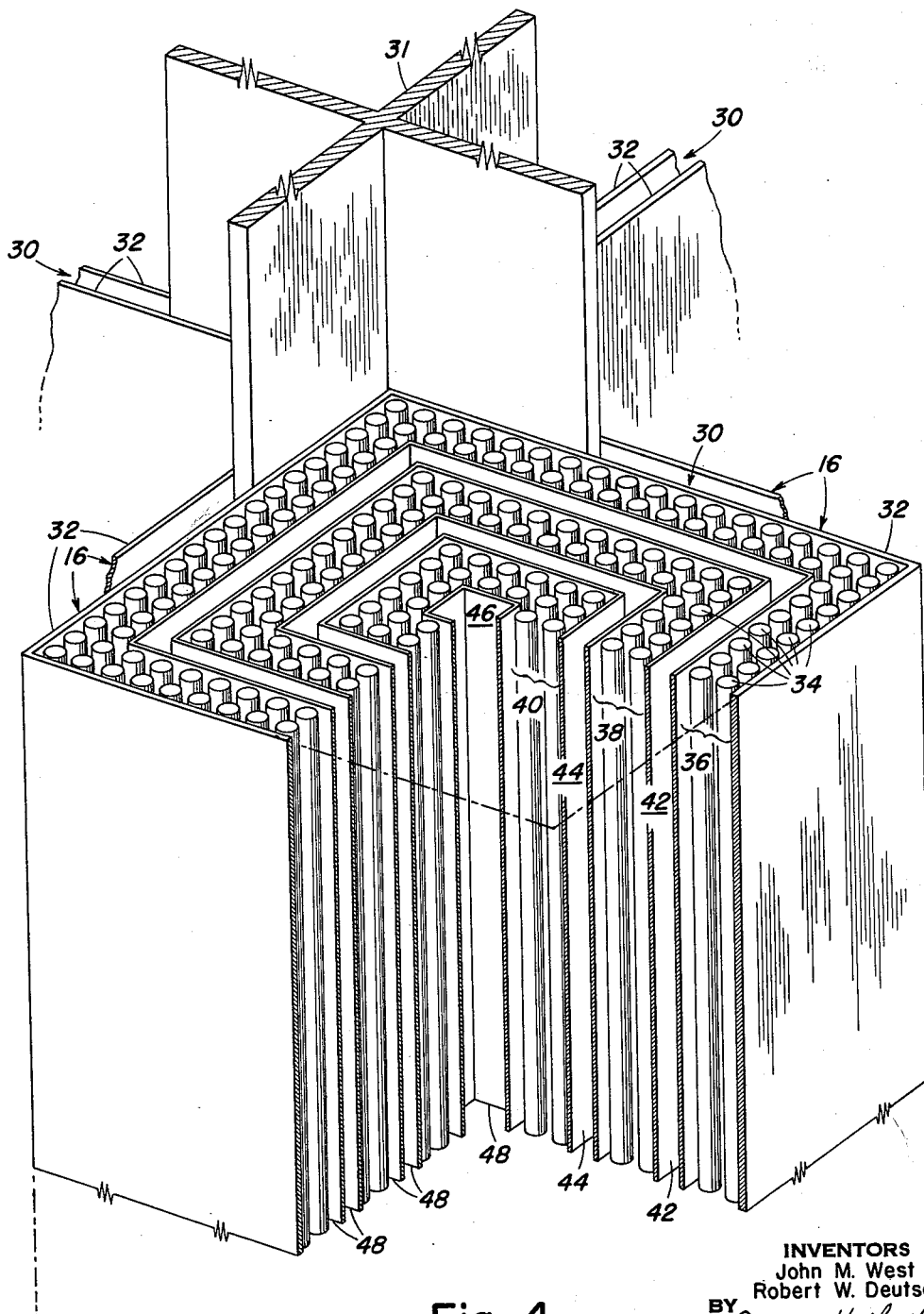
FIG. 4 is a fragmentary perspective view showing one of the fuel assemblies of the organization of FIG. 3 and the relation of the assembly with adjacent assemblies and with the control rod.

In traversing the core the coolant passes about and over the fuel elements or rods 34 in each of the assemblies with heat being imparted from the elements to the coolant during operation of the reactor. In order that the temperature of each of the fuel elements in an assembly will be generally the same, the assemblies 16 are constructed as shown in FIGS. 3 and 4 with these figures illustrating one complete fuel assembly and its relation with a number of adjacent assemblies. In these views, the several assemblies 16 are shown in spaced relation forming channel 30 between these assemblies or boxes which channel is for the reception of a control rod 31 which may advantageously have a transverse section of cruciform configuration. Each of the assemblies 16 is comprised of an outer wall member 32 of a low neutron absorption material such as zironium and within which are housed a relatively large number of fuel elements or rods 34 which may advantageously take the form of $UO_2$ pellets disposed and retained within suitable tubes of zirconium, stainless steel, aluminum or the like. The fuel elements 34 are arranged in annular or circumferentially extending pairs of rows 36, 38 and 40 with the rows of elements in each pair being in relatively closed spaced relation and with the pairs of rows being spaced as shown to provide channels 42, 44 and 46 with channels 42 and 44 being lined with wall members 48 which are also of a material having a low neutron absorption cross section. Channels 42, 44 and 46 are filled with a neutron moderator and this may be the moderator-coolant which flows up through the reactor core or alternatively this internal moderator may be some other material than the coolant and may be an organic compound or a solid moderator such as beryllium, beryllium oxide or graphite. If the coolant is also the moderator employed in channels 42, 44 and 46 the wall structure 48 may well be eliminated while if a separate moderator is employed which it is desired to separate from the coolant this wall structure will be employed.

The various elements of the fuel assembly including the wall structure and the fuel rods or elements are retained in fixed relation with respect to each other with suitable spacing and retaining means, not shown, being provided for this purpose. Each of the assemblies 16 is preferably individually removable from the reactor core in order to facilitate assembling the core and replacing various portions when necessary.

The channels 42, 44 and 46 are so related to channels 30 and the moderator in these various channels is such that the neutron flux in which each of the fuel elements in an assembly operates is generally uniform throughout the transverse area of the assembly. It will be noted that with the organization of the invention each row of fuel elements is adjacent a channel which is filled with a moderator thereby providing this uniform flux density and eliminating the hot spots heretofore so prevalent.

Figure 5:
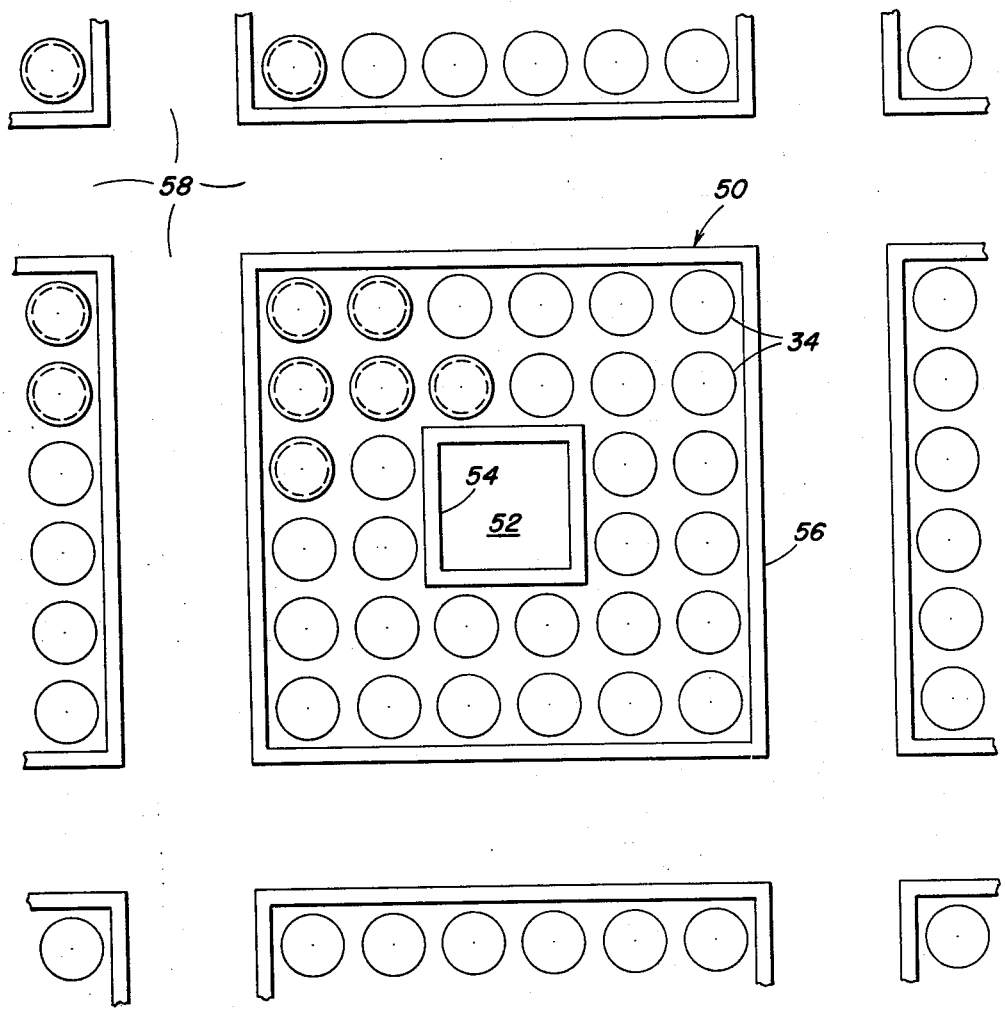
FIG. 5 is a view in the nature of that of FIG. 3 but showing a modified type of fuel assembly.

In the organization of FIG. 5, the fuel assembly identified as 50 contains only two rows of the fuel elements 34 with a channel 52 being formed in the center of the assembly and with the assembly having an inner wall 54 and an outer wall 56. In this assembly the outer row has six elements per side and the inner row four elements per side with this being referred to as a 6 x 6 assembly. The central channel is of such size that it would be occupied by four fuel elements in conventional practice with these elements being omitted in order to provide a moderator channel adjacent the inner row of elements for power flattening. With this modified organization there will of course be more fuel assemblies in a particular reactor than with the previously described embodiment, with the assemblies being spaced as shown in FIG. 5 to provide channels 58 between adjacent assemblies which channels receive a control rod. The effect obtained with regard to uniform power distribution with this modified organization is the same as that previously described since each row of fuel elements is adjacent a channel within which is disposed a moderator. Channel 52, as in the case of channels 42, 44 and 46, may contain the moderator-coolant flowing up through the reactor core or may contain other known moderators.

Figure 6:
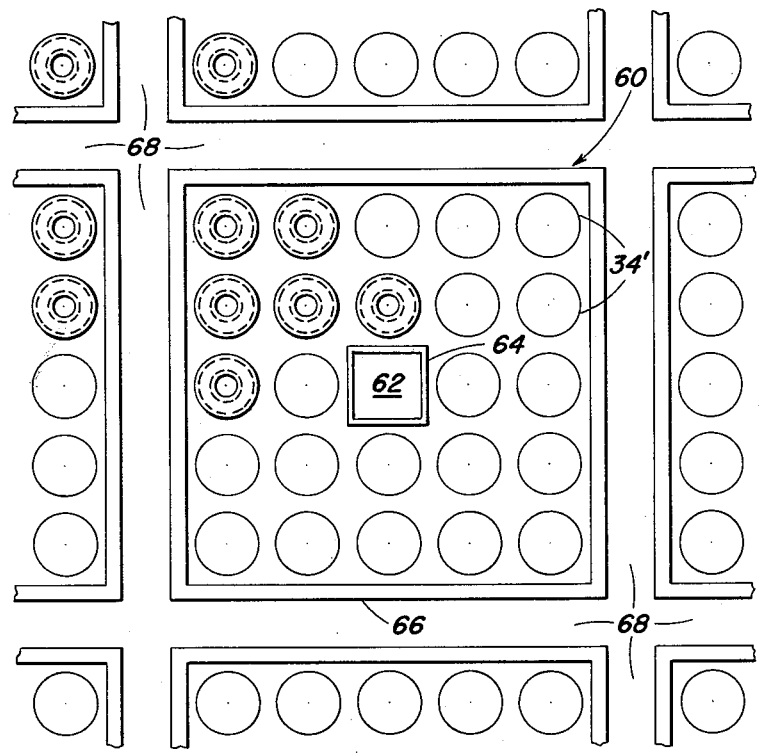
FIG. 6 is also a view in the nature of that of FIG. 3 but showing another modified type of fuel assembly.

The organization of FIG. 6 is generally similar to that of FIG. 5 except that the FIG. 6 arrangement employs a 5 x 5 array and the elements are annular. As embodied, the FIG. 6 fuel assembly, identified as 60, contains two rows of elements 34' with a channel 62 being formed in the center of the assembly and with the assembly having an inner wall 64 and an outer wall 66. The outer row of each of the assemblies has five elements per side and the inner row three elements with the assemblies being referred to as a 5 x 5 assembly. The central channel is of such size that it would be occupied by a single element in conventional practice with this element being omitted in order to provide a moderator channel for power flattening. In this FIG. 6 embodiment the assemblies 60 are spaced as shown to provide channels 68 between adjacent assemblies which channels receive a control rod. The effect obtained with regard to uniform power distribution with this embodiment is the same as with the previously described embodiments since each row of fuel elements is adjacent a channel within which is disposed a moderator. The central channel 62 may contain either the moderator-coolant flowing up through the reactor core or may contain other known moderators. The fuel rods in this FIG. 6 embodiment are preferably of the annular type wherein a pair of protecting or cladding tubes are disposed one within another with the annulus between the tubes being filled with a fuel such as $UO_2$ and with this annulus being sealed.

It will be appreciated that in accordance with the invention the problem with regard to hot spots due to non-uniform distribution of the neutron moderator with regard to the fuel elements is eliminated or substantially lessened with a generally uniform power distribution for the elements in an assembly being provided.

The organization of the invention, in addition to flattening the power over the assembly, provides other advantages as a result of the relatively large internal passageway extending throughout the length of the assemblies. These advantages are:

(1) Permitting the reactor to be controlled by means of the moderator in these regions. For liquid moderators this could be done by adjusting the height of the moderator or by displacing the liquid with a solid low absorption metallic rod. Solid moderators can be varied in size, shape or position to change reactivity, flux distribution and conversion ratio.

(2) Permitting the addition of extra control to the reactor by inserting shim rods in the internal moderator space or poison rods or balls may be poised above the moderator region to be dropped into the space for partial control or for complete reactor shutdown.

(3) Permitting monitoring of the reactor for power and neutron flux by inserting monitors in the moderating space. Other instruments such as those to detect fuel element failure may also be inserted in this space.

(4) Providing an area to irradiate various elements such as cobalt and lithium to produce valuable isotopes.

(5) Provide access for mechanical hold-down mechanism that pass through the internal moderator region and fasten to the bottom of the reactor.

While we have illustrated and described a preferred embodiment of our invention, it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. In a thermal nuclear reactor, a water cooled and moderated core structure comprising a multiplicity of similar, parallel, right prismatic fissionable-fuel-assemblies laterally spaced apart and defining a first group of water filled channels of uniform width in the space between said assemblies, control rods disposed within said first group of channels parallel to said assemblies, each of said assemblies comprising a multiplicity of longitudinally extending fuel rods arranged in rows forming at least one generally annular fuel region, a second group of water filled channels disposed within said assemblies, at least one channel of said second group being disposed within each of said assemblies, and each of said rows of fuel rods being disposed adjacent and parallel to one of said channels.

2. The core structure of claim 1 wherein said fuel rod rows form a plurality of annular fuel regions within each of said fuel assemblies, and wherein said annular regions are disposed concentrically one within another and spaced apart to define channels of said second group.

3. The core structure of claim 1 wherein said fuel rod rows form a single annular fuel region disposed within each of said assemblies, said annular fuel region forming a central, water-filled space free of fuel rods.

References Cited in the file of this patent

UNITED STATES PATENTS

| | | |
|---|---|---|
| 2,774,730 | Young | Dec. 18, 1956 |
| 2,848,404 | Treshow | Aug. 19, 1958 |
| 2,947,678 | Gimera et al. | Aug. 2, 1960 |
| 2,977,297 | Evans et al. | Mar. 28, 1961 |
| 2,992,981 | Thomson | July 18, 1961 |
| 3,024,181 | Howard et al. | Mar. 6, 1962 |

OTHER REFERENCES

TID–7559 (Part 1) (AEC publication) (pages 9 to 27).